Figure 1:
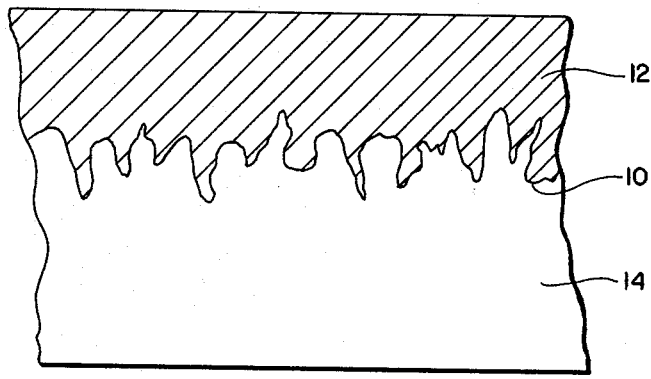

Dec. 29, 1964    R. W. DOUGLASS ETAL    3,163,563
COMPOSITE BODY FORMED OF A TANTALUM ALLOY HAVING
AN OUTER CARBURIZED SURFACE LAYER
Filed July 13, 1962

INVENTOR.
RICHARD W. DOUGLASS
MAURICE L. TORTI, JR.
BY
Edward A. Gordon

United States Patent Office 3,163,563
Patented Dec. 29, 1964

3,163,563
COMPOSITE BODY FORMED OF A TANTALUM ALLOY HAVING AN OUTER CARBURIZED SURFACE LAYER
Richard W. Douglass, Needham, and Maurice L. Torti, Jr., Boston, Mass., assignors to National Research Corporation, Cambridge, Mass., a corporation of Massachusetts
Filed July 13, 1962, Ser. No. 209,563
5 Claims. (Cl. 148—34)

This invention relates to new compositions of matter and more particularly to novel compositions of matter notable for their resistance to corrosion and erosion at high temperatures and having strength and hardness at high temperatures. These novel hard compositions of matter are particularly useful where resistance to high temperature, corrosive and erosive environmental conditions is required.

Hard compositions of matter are presently known which consist, for example, of one or more metal carbides which are prepared in comminuted form and then pressed and sintered to the shape of the piece to be made. In similar compositions the metal carbide particles are united into a cohesive mass by mixing with a metal binder. Although such pressed and sintered compositions are hard, they are accompanied by numerous disadvantages. Such sintered compositions are brittle and are lacking in strength, fall density and resistance to cracking. Where a metal binder is used, for example, the sintered compositions while having some improved ductility lack resistance to high temperatures. The temperature to which such a composition can be subjected is limited to a temperature substantially below the melting point of the metal binder. In either case the pressed and sintered composition must be prepared in the shape of the piece to be made. Such problems as shrinkage during sintering render fabrication to certain dimensions dependent upon the amount of shrinkage which takes place in the process.

Another example of a hard composition heretofore known is one in which tantalum metal in the shape of the piece to be made is carburized either totally throughout its cross section or partially to form a carbide surface. When totally carburized the resulting tantalum carbide piece, while hard, is brittle and lacks resistance to thermal shock and crack propagation. Tantalum pieces having a tantalum carbide surface layer have been found to be lacking in resistance to corrosion and erosion and particularly lacking in resistance to spalling of the carbide layer.

A principal object of the present invention is to provide new hard compositions of matter having greatly improved resistance to erosion and corrosion at high temperatures.

A further object of the present invention is to provide new hard dense compositions of matter which are resistant to spalling and crack propagation.

A further object of the present invention is to provide the new hard compositions of matter having combined strength and hardness in addition to improved ductility at high temperatures.

Other objects of the invention will in part be obvious and will in part appear hereinafter.

The invention accordingly comprises the product possessing the features, properties and the relation of components and the process involving the several steps and the relation and order of one or more of such steps with respect to each of the others which are exemplified in the following detailed disclosure and the scope of the application of which will be indicated in the claims.

Figure 2:
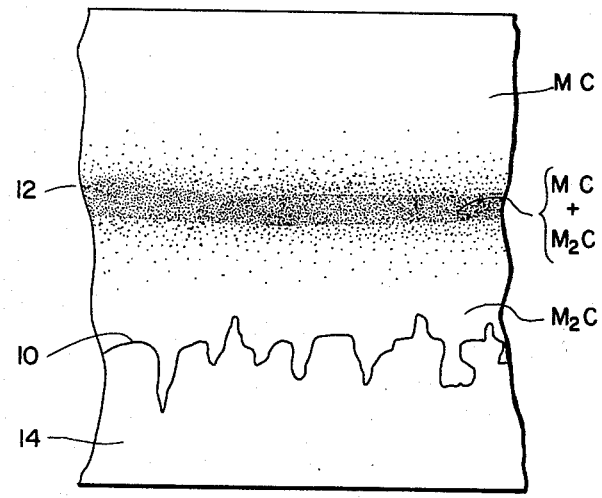

For a fuller understanding of the nature and objects of the invention reference should be had to the following detailed description taken in connection with the accompanying drawing wherein:

FIG. 1 is a diagrammatic, schematic, fragmentary sectional view of a preferred embodiment of the invention; and FIG. 2 is an enlarged view of a portion of FIG. 1.

In one preferred embodiment of the present invention the novel hard compositions of matter consist of an inner core formed of an alloy of tantalum with a metal selected from the group consisting of tungsten, hafnium, and mixtures thereof and having a hard high temperature resistant outer diffusion layer consisting of the carbides of the alloying elements. The interface between the outer alloy carbide diffusion layer and the inner alloy core is diffuse, irregular, and interlocking.

It has been discovered in accordance with the present invention (reference being made to FIG. 1 of the drawing) that when 1 to 50 percent by weight and preferably 5 to 30 percent by weight of tungsten, hafnium or mixtures thereof, are alloyed with tantalum metal there is formed, upon subsequent carburization of the alloy surface, a diffuse, irregular, interlocking interface 10 between the outer alloy carbide diffusion layer 12 and the inner alloy core 14. The irregular, interlocking interface 10 resists spalling of the carbide layer 12; that is, cracking and propagation of the crack along a layer parallel to the outer carbide surface.

It has further been discovered (reference being made to FIG. 2 of the drawing) that the carbide layer 12 formed from carburization of the alloys is different from a carbide layer formed for example by carburization of tantalum metal. The carbide layer of the present invention has a structure similar to a carbide layer formed on carburized tantalum metal; that is, an outer carbide of the type MC, an inner carbide of the type $M_2C$, and an intermediate mixture of MC and $M_2C$ wherein M represents the metal content of the carbide. While the carbide layer structure is similar, the outer carbide (MC type) is found to be greater in thickness than the similar MC type carbide of carburized tantalum for a given total carbide layer thickness. This forms an important feature of the present invention since it provides for a thicker layer of the harder carbide (MC type) for a given thickness of the total carbide layer and thus permits a greater amount of the inner ductile core to remain uncarburized.

Thus, the unique features of the hard compositions of matter of the present invention are seen when it is realized that a ductile material, such as an alloy of tantalum with tungsten, hafnium or mixtures thereof can be easily fabricated to a complex shape and then carburized to provide a hard alloy carbide surface layer. The composition of matter thus has the hard high temperature resistant properties of the outer carbide layer but does not have the disadvantage of brittleness which is inherent in such carbides. The brittleness is substantially reduced or overcome by the soft ductile inner alloy core. The inner alloy core serves to resist crack propagation inward from the outer carbide surface. Spalling of the carbide layer; that is, cracking and breaking along a line parallel to the outer surface, is substantially reduced or overcome by the irregular interlocking interface between the carbide layer and the inner ductile core. Additionally the hard compositions of matter of the present invention are 100% dense and thus provide a stronger erosion resistant structure than a structure of the pressed and sintered type which is not 100% dense.

The alloys can be prepared in accordance with conventional procedures through recourse to known melting and casting techniques. Thus the individual metals can be melt cast together and the melt allowed to cool and solidify into a desired shape. The melting operation can be carried out in a vacuum arc melting or electron beam furnaces. Whatever type of furnacing means is employed, care should be exercised to protect the molten metal from normal atmospheric contamination through contact with oxygen, nitrogen and the like.

The tantalum alloys thus prepared can be fabricated to the desired shape of the piece to be made by standard metalworking techniques. The piece is then carburized by known methods to provide a carbide layer of the desired thickness. The total thickness of the carbide layer can be varied depending on the particular use and conditions which is to be made of the final piece. In any event the carbide layer should not extend through the cross sectional area of the piece; that is, the piece should not be totally carburized.

In a preferred embodiment of the present invention carburization was carried out in a carbon crucible inductively heated to an elevated temperature in an atmosphere of methane at about 20–50 mm. pressure. A constant methane flow rate of about 20 cubic feet per minute was maintained.

A comparison of the carburization (under varying conditions of time and temperature) of tantalum with that of tantalum alloyed with tungsten and hafnium in accordance with the present invention is shown in Table 1 which sets forth non-limiting examples of this aspect of the invention. As can be seen from Table 1 the thickness of the MC carbide (monocarbide) layer is increased and the thickness of the $M_2C$ carbide (hemicarbide) layer is decreased by the addition of tungsten and hafnium to the tantalum. The significance of these results is that thicker layers of the harder high temperature erosion resistant MC type carbide is obtained with lower total carbide layer thicknesses.

TABLE 1

*Carbide Thickness, Inches*

| Alloy | MC | MC+$M_2C$ | $M_2C$ | Total Carbide Layer |
|---|---|---|---|---|
| CARBURIZED ½ HOUR AT 2,300° C. | | | | |
| Ta | .001–.0012 | .0014 | .0073 | .0097 |
| Ta-10W | .001 | .0011 | .0018 | .0039 |
| CARBURIZED 4¼ HOURS AT 2,300° C. | | | | |
| Ta | .0027 | .0051 | .0158 | .0236 |
| Ta-10W | .0031 | .0061 | .0039 | .0131 |
| Ta-10Hf | .0027 | .0031–.0039 | .0118–.0138 | .0176–.0204 |
| CARBURIZED 7¼ HOURS AT 2,300° C. | | | | |
| Ta | .0043 | .0051 | .0210 | .0304 |
| Ta-10W | .0051–.0059 | .0059 | .0039 | .0149–.0157 |
| Ta-15W | .0051 | .0067 | .0039–.0059 | .0157–.0177 |
| Ta-10Hf | .0043 | .0031 | .0134 | .0208 |
| CARBURIZED ¾ HOUR AT 2,500° C. | | | | |
| Ta | .002 | .0035 | .0145 | .0200 |
| Ta-10W | .0027 | .0027 | .0043–.0051 | .0097–.0150 |
| Ta-15W | .0035 | .0051 | .0051–.0059 | .0137–.0145 |
| Ta-20W | .0047 | .0051 | .0024–.0043 | .0122–.0141 |
| Ta-30W | .0059–.0067 | .0039–.0047 | .0039–.0047 | .0137–.0161 |
| CARBURIZED 4 HOURS AT 2,500° C. | | | | |
| Ta | .0063 | .0094 | .0400 | .0557 |
| Ta-10W | .0091 | .0114 | .0087 | .0292 |
| Ta-20W | .0145 | .0130 | .0071 | .0346 |
| Ta-10Hf | .0071 | .0098 | .0310 | .0479 |

In one specific non-limiting example, a hard composition of matter in accordance with the present invention comprises a carburized 80% tantalum–20% hafnium alloy. When carburized the tantalum–20 hafnium alloy will provide a dense hard composition of matter having a ductile inner core and an interlocking carbide layer having an outer carbide surface layer (MC type) having a composition of about (Ta–20Hf)C or 80% TaC–20%HfC. This particular carbide composition is one of the highest melting materials known.

Table 2, set forth below, illustrates the improved performance of hard compositions of matter in accordance with the present invention, as compared to other materials, when tested under the same conditions of exposure to a rapidly flowing stream of an erosive, corrosive gas mixture at elevated temperatures.

TABLE 2

*Resistance to Test Gas Mixture*

| Material | Total Carbide Layer Thickness (mils) | Test Gas Temp., °F. | Result |
|---|---|---|---|
| 1. Ta-10W | 30 | 6,240 | Slight erosion, no spalling, cracking or corrosion. |
| 2. Ta-10W | 40 | 6,500 | Do. |
| 3. Ta-10W | 60 | 6,240 | Do. |
| 4. Ta-10W | Uncarburized | 5,400 | Failed—severe erosion. |
| 5. Ta | 60 | 6,240 | Do. |
| 6. Ta | Total carburization. | 6,240 | Failed—fractured. |

As can be seen from Table 2, Examples 1, 2 and 3, illustrative of the present invention, provide for greatly improved performance under the test conditions. These hard compositions of matter were only slightly eroded and had no spalling, cracking or corrosion. In comparison the uncarburized alloy, carburized tantalum, and totally carburized tantalum all failed under the same test conditions due to severe erosion, cracking or spalling.

Additionally, initial experiments have shown that as the alloying element (tungsten for example) of the hard compositions of matter of the present invention is increased from 5 to 30% by weight the slight erosion is substantially reduced.

While the hard compositions of matter of the present invention have been described primarily with respect to tantalum base alloys of tungsten, hafnium and mixtures thereof, the principles of the invention are equally applicable to alloying elements of titanium, zirconium, vanadium, niobium, chromium, molybdenum, and mixtures thereof and equally to niobium (including mixtures of tantalum and niobium) base alloys of titanium, zirconium, hafnium, vanadium, tantalum, chromium, molybdenum, tungsten, and mixtures thereof.

Since certain changes can be made in the above processes and product without departing from the scope of the invention herein involved, it is intended that all matter contained in the above description shall be interpreted as illustrative and not in a limiting sense.

What is claimed is:

1. As an article of manufacture a composite body consisting of an inner ductile core formed of an alloy of a metal selected from the group consisting of tantalum, niobium and mixtures thereof with about 1 to 50% by weight of an alloying metal selected from the group consisting of titanium, zirconium, hafnium, vanadium, chromium, molybdenum, tungsten, and mixtures thereof and a hard, high-temperature-resistant, outer carburized layer, said outer carburized layer having several strata, the outer stratum consisting essentially of the monocarbides of the alloy constituents, said outer stratum being at least .001 inch thick and having the physical properties of the monocarbides, said outer stratum being in intimate contact with an intermediate stratum of mixed monocarbides and hemicarbides of the alloy constituents the percentage of hemicarbides increasing with depth, the interface between said outer carburized layer and said inner core being irregular and interlocking whereby crack propagation parallel to said outer layer is restricted.

2. As an article of manufacture a composite body consisting of an inner ductile core formed of an alloy of tantalum with about 1 to 50% by weight of an alloying metal selected from the group consisting of titanium, zirconium, hafnium, vanadium, chromium, molybdenum, tungsten, and mixtures thereof and a hard, high-temperature-resistant, outer carburized layer, said outer carburized layer having several strata, the outer stratum consisting essentially of the monocarbides of the alloy constituents, said outer stratum being at least .001 inch thick and having the physical properties of the monocarbides, said outer stratum being in intimate contact with an intermediate stratum of mixed monocarbides and hemicarbides of the alloy constituents the percentage of hemicarbides increasing with depth, the interface between said outer carburized layer and said inner core being irregular and interlocking whereby crack propagation parallel to said outer layer is restricted.

3. The composite body of claim 2 wherein the tantalum alloy contains about 5 to 30 weight percent of an alloying metal selected from the group consisting of tungsten and hafnium and mixtures thereof.

4. The composite body of claim 3 wherein the tantalum alloy contains about 10 weight percent tungsten.

5. The composite body of claim 3 wherein the tantalum alloy contains about 20 weight percent hafnium.

References Cited in the file of this patent

UNITED STATES PATENTS

| | | |
|---|---|---|
| 2,122,403 | Balke et al. | July 5, 1938 |
| 2,417,458 | Eitel et al. | Mar. 18, 1947 |
| 2,832,710 | Ruthardt | Apr. 29, 1958 |
| 2,964,399 | Lyons | Dec. 13, 1960 |
| 2,991,192 | Halden et al. | July 4, 1961 |
| 3,027,255 | Begley et al. | Mar. 27, 1962 |
| 3,050,575 | Sullivan | Aug. 21, 1962 |